United States Patent [19]
Jones et al.

[11] Patent Number: 5,905,509
[45] Date of Patent: May 18, 1999

[54] ACCELERATED GRAPHICS PORT TWO LEVEL GART CACHE HAVING DISTRIBUTED FIRST LEVEL CACHES

[75] Inventors: Phillip M. Jones, Spring; Robert Allan Lester, Houston; Kenneth Tom Chin, Cypress, all of Tex.

[73] Assignee: Compaq Computer Corp., Houston, Tex.

[21] Appl. No.: 08/941,860

[22] Filed: Sep. 30, 1997

[51] Int. Cl.$^6$ .............................. G06F 13/14; G06F 12/08
[52] U.S. Cl. .......................... 345/520; 345/501; 711/122; 711/202; 395/280; 395/309
[58] Field of Search ..................... 345/501–506, 345/520, 521, 512, 508, 511, 203; 711/100, 117–122, 141–143, 200, 202, 203, 205–209, 221; 395/309, 310, 280, 284, 728, 729, 731, 828, 829, 842, 843, 846–848, 859, 872, 874

[56] References Cited

U.S. PATENT DOCUMENTS

| | | | |
|---|---|---|---|
| 5,479,627 | 12/1995 | Khalidi et al. | 711/205 |
| 5,546,555 | 8/1996 | Horstmann et al. | 711/207 |
| 5,812,789 | 9/1998 | Diaz et al. | 395/200.77 |

OTHER PUBLICATIONS

Brummer, Robert, "PCI–to–AGP Move Boosts 3–D Graphics", Electronic Engineering Times, May 5, 1997, n952, p. 84.

Yao, Yong, "AGP Speeds 3D Graphics", Microprocessor Report, Jun. 17, 1996, v10, n8, p. 11(5).

Halfhill, Tom, "Unclogging the PC Bottlenecks", BYTE, Sep. 1997, vol. 22, No. 9, p. 80NA1.

Primary Examiner—Ulka Chauhan
Attorney, Agent, or Firm—Paul N. Katz; Ronald L. Chichester; Frohwitter

[57] ABSTRACT

A computer system having a core logic chipset that functions as a bridge between an Accelerated Graphics Port ("AGP") bus device such as a graphics controller, and a host processor and computer system memory wherein a Graphics Address Remapping Table ("GART table") is used by the core logic chipset to remap virtual memory addresses used by the AGP graphics controller into physical memory addresses that reside in the computer system memory. The GART table enables the AGP graphics controller to work in contiguous virtual memory address space, but actually use non-contiguous blocks or pages of physical system memory to store textures, command lists and the like. The GART table is made up of a plurality of entries, each entry comprising an address pointer to a base address of a page of graphics data in memory, and feature flags that may be used to customize the associated page. The core logic chipset caches a subset of the most recently used GART table entries to increase AGP performance when performing the address translation. The core logic chipset uses a two-level GART cache comprising a plurality of first-level GART caches and a common second level GART cache. Each of the plurality of first-level GART caches are coupled to a respective interface in the computer system and effectively de-couple the different interface GART address translations so that GART cache thrashing and cache arbitration delays are substantially reduced. Separate decoupled first-level GART caches for each interface allow concurrent GART address translations among the different interfaces. Individual first-level GART caches may be fined tuned for each associated interface.

34 Claims, 6 Drawing Sheets

ACCELERATED GRAPHICS PORT TWO LEVEL GART CACHE HAVING DISTRIBUTED FIRST LEVEL CACHES

CROSS REFERENCE TO RELATED PATENT APPLICATION

This patent application is related to commonly owned U.S. patent application Ser. No. 08/853,289; filed May 9, 1997; entitled "Dual Purpose Apparatus, Method and System for Accelerated Graphics Port and Peripheral Component Interconnect" by Ronald T. Horan and Sompong Olarig, and is hereby incorporated by reference.

BACKGROUND OF THE INVENTION

Field of the Invention

The present invention relates to computer systems using a bus bridge(s) to interface a central processor(s), video graphics processor(s), random access memory and input-output peripherals together, and more particularly, in utilizing a two-level cache having distributed first-level caches that are coupled to respective interfaces and a second-level cache that is commonly used by the first-level caches, the second-level cache being coupled to a memory controller for obtaining GART table entries from the computer system main memory when needed because of a cache miss in both the first-level and second-level caches.

DESCRIPTION OF THE RELATED TECHNOLOGY

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be stand-alone workstations (high end individual personal computers), desk-top personal computers, portable lap-top computers and the like, or they may be linked together in a network by a "network server" which is also a personal computer which may have a few additional features specific to its purpose in the network, The network server may be used to store massive amounts of data, and may facilitate interaction of the individual workstations connected to the network for electronic mail ("E-mail"), document databases, video teleconferencing, white boarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1 PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN are available from the PCI Special Interest Group, P.O. Box 14070, Portland, Oreg. 97214.

A computer system has a plurality of information buses (used for transferring instructions, data and address) such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Computer systems typically utilize at least one "cache memory" for improved performance. In common usage, the term "cache" refers to a hiding place. The name "cache memory" is an appropriate term for this high speed memory that is interposed between a processor, or bus agent, and main memory because cache memory is hidden from the user or programmer, and thus appears to be transparent. Cache memory, serving as a fast storage buffer between the processor, or bus agent, and main memory, is not user addressable. The user is only aware of the apparently higher-speed memory accesses because the cache memory is satisfying many of the requests instead of the slower main memory.

Cache memory is smaller than main memory because cache memory employs relatively expensive high speed memory devices, such as static random access memory ("SRAM"). Therefore, cache memory typically will not be large enough to hold all of the information needed during program execution. As a process executes, information in the cache memory must be replaced, or "overwritten" with new information from main memory that is necessary for executing the current process(es).

Information is only temporarily stored in cache memory during execution of the process(es). When process data is referenced by a processor, or bus agent, the cache controller will determine if the required data is currently stored in the cache memory. If the required information is found in cache memory, this is referred to as a "cache hit." A cache hit allows the required information to be quickly retrieved from or modified in the high speed cache memory without having to access the much slower main memory, thus resulting in a significant savings in program execution time. When the required information is not found in the cache memory, this is referred to as a "cache miss." A cache miss indicates that the desired information must be retrieved from the relatively slow main memory and then placed into the cache memory. Cache memory updating and replacement schemes attempt to maximize the number of cache hits, and to minimize the number of cache misses.

A cache memory is said to be "direct mapped" if each byte of information can only be written to one place in the cache memory. The cache memory is said to be "fully associative" if a byte of information can be placed anywhere in the cache memory. The cache memory is said to be "set associative" if a group of blocks of information from main memory can only be placed in a restricted set of places in the cache memory, namely, in a specified "set" of the cache memory. Computer systems ordinarily utilize a variation of set associative mapping to keep track of the bytes of information that have been copied from main memory into cache memory.

The hierarchy of a set associative cache memory resembles a matrix. That is, a set associative cache memory is divided into different "sets" (such as the rows of a matrix) and different "ways" (such as the columns of a matrix). Thus, each line of a set associative cache memory is mapped or placed within a given set (row) and within a given way (column). The number of columns, i.e., the number of lines in each set, determine the number of "ways" of the cache memory. Thus, a cache memory with four columns (four lines within each set) is deemed to be "4-way set associative."

Set associative cache memories include addresses for each line in the cache memory. Addresses may be divided into three different fields. First, a "block-offset field" is utilized to select the desired information from a line. Second, an "index field" specifies the set of cache memory where a line is mapped. Third, a "tag field" is used for purposes of comparison. When a request originates from a processor, or bus agent, for new information, the index field selects a set of cache memory. The tag field of every line in the selected set is compared to the tag field sought by the processor. If the tag field of some line matches the tag field sought by the processor, a "cache hit" is detected and information from the block is obtained directly from or modified in the high speed cache memory. If no match occurs, a "cache miss" occurs and the cache memory is typically updated. Cache memory is updated by retrieving the desired information from main memory and then mapping this information into a line of the set associative cache. When the "cache miss" occurs, a line is first mapped with respect to a set (row), and then mapped with respect to a way (column). That is, the index field of a line of information retrieved from main memory specifies the set of cache memory wherein this line will be mapped. A "replacement scheme" is then relied upon to choose the particular line of the set that will be replaced. In other words, a replacement scheme determines the way (column) where the line will be located. The object of a replacement scheme is to select for replacement the line of the set that is least likely to be needed in the near future so as to minimize further cache misses.

Several factors contribute to the optimal utilization of cache memory in computer systems: cache memory hit ratio (probability of finding a requested item in cache), cache memory access time, delay incurred due to a cache memory miss, and time required to synchronize main memory with cache memory (write back or write through). In order to minimize delays incurred when a cache miss is encountered, as well as improve cache memory hit rates, an appropriate cache memory replacement scheme is used.

Set associative cache memory replacement schemes may be divided into two basic categories: non-usage based and usage based. Non-usage based replacement schemes, which include first in, first out ("FIFO") and "random" replacement schemes, make replacement selections on some basis other than memory usage. The FIFO replacement scheme replaces the line of a given set of cache memory which has been contained in the given set for the longest period of time. The random replacement scheme randomly replaces a line of a given set.

Usage based schemes, which include the least recently used ("LRU") replacement scheme, take into account the history of memory usage. In the LRU replacement scheme the least recently used line of information in cache memory is overwritten by the newest entry into cache memory. An LRU replacement scheme assumes that the least recently used line of a given set is the line that is least likely to be reused again in the immediate future. An LRU replacement scheme thus replaces the least recently used line of a given set with a new line of information that must be copied from main memory.

When a cache miss occurs, a main memory access must be performed to obtained the desired information which will be stored in the cache. Typically a main memory read access is a cacheline, four quadwords, or 32 bytes in size. Whenever a cacheline of information from the main memory read access is returned, it is returned in toggle mode order, critical quadword first. The transfer order of the four quadwords comprising the cacheline is based on the position of the critical quadword within the cacheline. The toggle mode transfer order is based on an interleaved main memory architecture where the quadwords are woven, or interleaved, between two banks of main memory. The four quadwords comprising the cacheline are taken in an order that always accesses opposite main memory banks so that the main memory bank not being accessed may be charged up and ready to accept another access. The toggle mode allows better main memory performance when using dynamic random access memory (DRAM) because memory accesses are not slowed down by pre-charge delays associated with operation of the DRAM.

Increasingly inexpensive but sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Cyrix, IBM, Digital Equipment Corp., Sun Microsystems and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics information stored in memory. This memory may be part of the video graphics processor system, but, preferably, would be best (lowest cost) if part of the main computer system memory because shifting graphics information from local graphics memory to main memory significantly reduces computer system costs when implementing 3-D graphics. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system main memory. The computer system main memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system main memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, the disclosure of which is hereby incorporated by reference. The AGP Specification is available from Intel Corporation, Santa Clara, Calif.

The AGP Specification uses the 66 MHz PCI (Revision 2.1) Specification as an operational baseline, with three performance enhancements to the PCI Specification which are used to optimize the AGP Specification for high performance 3-D graphics applications. These enhancements are: 1) pipelined memory read and write operations, 2) demultiplexing of address and data on the AGP bus by use of sideband signals, and 3) data transfer rates of 133 MHz for data throughput in excess of 500 megabytes per second ("MB/s"). The remaining AGP Specification does not modify the PCI Specification, but rather provides a range of graphics-oriented performance enhancements for use by 3-D graphics hardware and software designers. The AGP Specification is neither meant to replace nor diminish full use of the PCI Specification in the computer system. The AGP Specification creates an independent and additional high speed local bus for use by 3-D graphics devices such as a graphics controller, wherein the other input-output ("I/O") devices of the computer system may remain on any combination of the PCI, SCSI, EISA and ISA buses.

To functionally enable this AGP 3-D graphics bus, new computer system hardware and software are required. This requires new computer system core logic designed to function as a host bus/memory bus/PCI bus to AGP bus bridge meeting the AGP Specification, and new Read Only Memory Basic Input Output System ("ROM BIOS") and Application Programming Interface ("API") software to make the AGP dependent hardware functional in the computer system. The computer system core logic must still meet the PCI standards referenced above and facilitate interfacing the PCI bus(es) to the remainder of the computer system. In addition, new AGP compatible device cards must be designed to properly interface, mechanically and electrically, with the AGP bus connector.

AGP and PCI device cards are not physically interchangeable even though there is some commonality of signal functions between the AGP and PCI interface specifications. The present AGP Specification only makes allowance for a single AGP device on an AGP bus, whereas, the PCI Specification allows two plug-in slots for PCI devices plus a bridge on a PCI bus running at 66 MHz. The single AGP device is capable of functioning in both a 1× mode (264 MB/s peak) and a 2× mode (532 MB/s peak). The AGP bus is defined as a 32 bit bus, and may have up to four bytes of data transferred per clock in the 1× mode and up to eight bytes of data per clock in the 2× mode. The PCI bus is defined as either a 32 bit or 64 bit bus, and may have up to four or eight bytes of data transferred per clock, respectively. The AGP bus, however, has additional sideband signals which enables it to transfer blocks of data more efficiently than is possible using a PCI bus. An AGP bus running in the 2× mode provides sufficient video data throughput (532 MB/s peak) to allow increasingly complex 3-D graphics applications to run on personal computers.

A major performance/cost enhancement using AGP in a computer system is accomplished by shifting texture data structures from local graphics memory to main memory. Textures are ideally suited for this shift for several reasons. Textures are generally read-only, and therefore problems of access ordering and coherency are less likely to occur. Shifting of textures serves to balance the bandwidth load between system memory and local graphics memory, since a well-cached host processor has much lower memory bandwidth requirements than does a 3-D rendering machine; texture access comprises perhaps the single largest component of rendering memory bandwidth, so avoiding loading or caching textures in local graphics memory saves not only this component of local memory bandwidth, but also the bandwidth necessary to load the texture store in the first place, and, further, this data must pass through main memory anyway as it is loaded from a mass store device. Texture size is dependent upon application quality rather than on display resolution, and therefore may require the greatest increase in memory as software applications become more advanced. Texture data is not persistent and may reside in the computer system memory only for the duration of the software application, so any system memory spent on texture storage can be returned to the free memory heap when the application concludes (unlike a graphic controller's local frame buffer which may remain in persistent use). For these reasons, shifting texture data from local graphics memory to main memory significantly reduces computer system costs when implementing 3-D graphics.

Generally, in a computer system memory architecture the graphics controller's physical address space resides above the top of system memory. The graphics controller uses this physical address space to access its local memory which holds information required to generate a graphics screen. In the AGP system, information still resides in the graphics controller's local memory (textures, alpha, z-buffer, etc.), but some data which previously resided in this local memory is moved to system memory (primarily textures, but also command lists, etc.). The address space employed by the graphics controller to access these textures becomes virtual, meaning that the physical memory corresponding to this address space doesn't actually exist above the top of memory. In reality, each of these virtual addresses corresponds to a physical address in system memory. The graphics controller sees this virtual address space, referenced hereinafter as "AGP device address space," as one contiguous block of memory, but the corresponding physical memory addresses may be allocated in 4 kilobyte ("KB"), non-contiguous pages throughout the computer system physical memory.

There are two primary AGP usage models for 3D rendering, that have to do with how data are partitioned and accessed, and the resultant interface data flow characteristics. In the "DMA" model, the primary graphics memory is a local memory referred to as 'local frame buffer' and is associated with the AGP graphics controller or "video accelerator." 3D structures are stored in system memory, but are not used (or "executed") directly from this memory; rather they are copied to primary (local) memory, to which the rendering engine's address generator (of the AGP graphics controller) makes references thereto. This implies that the traffic on the AGP bus tends to be long, sequential transfers, serving the purpose of bulk data transport from system memory to primary graphics (local) memory. This sort of access model is amenable to a linked list of physical addresses provided by software (similar to operation of a disk or network I/O device), and is generally not sensitive to a non-contiguous view of the memory space.

In the "execute" model, the video accelerator uses both the local memory and the system memory as primary graphics memory. From the accelerator's perspective, the two memory systems are logically equivalent; any data structure may be allocated in either memory, with performance optimization as the only criteria for selection. In general, structures in system memory space are not copied into the local memory prior to use by the video accelerator, but are "executed" in place. This implies that the traffic on the AGP bus tends to be short, random accesses, which are not amenable to an access model based on software resolved lists of physical addresses. Since the accelerator generates direct references into system memory, a contiguous view of that space is essential. But, since system memory is dynamically allocated in, for example, random 4,096 byte blocks of the memory, hereinafter 4 kilobyte ("KB") pages, it is necessary in the "execute" model to provide an address mapping mechanism that maps the random 4 KB pages into a single contiguous address space.

The AGP Specification, incorporated by reference hereinabove, supports both the "DMA" and "execute" models. However, since a primary motivation of the AGP is to reduce growth pressure on the graphics controller's local memory (including local frame buffer memory), the "execute" model is preferred. Consistent with this preference, the AGP Specification requires a virtual-to-physical address re-mapping mechanism which ensures the graphics accelerator (AGP master) will have a contiguous view of graphics data structures dynamically allocated in the system memory. This address re-mapping applies only to a single, programmable range of the system physical address space and is common to all system agents. Addresses falling in this range are re-mapped to non-contiguous pages of physical system memory. All addresses not in this range are passed through without modification, and map directly to main system memory, or to device specific ranges, such as a PCI device's physical memory. Re-mapping is accomplished via a "Graphics Address Remapping Table" ("GART table") which is set up and maintained by a GART miniport driver software, and used by the core logic chipset to perform the re-mapping. In order to avoid compatibility issues and allow future implementation flexibility, this mechanism is specified at a software (API) level. In other words, the actual GART table format may be abstracted to the API by a hardware abstraction layer ("HAL") or miniport driver that is provided with the core logic chipset. While this API does not constrain the future partitioning of re-mapping hardware, the re-mapping function will typically be implemented in the core logic chipset.

The contiguous AGP graphics controller's device addresses are mapped (translated) into corresponding physical addresses that reside in the computer system physical memory by using the GART table which may also reside in physical memory. The GART table is used by the core logic chipset to remap AGP device addresses that can originate from either the AGPE host, or PCI buses. The GART table is managed by a software program called a "GART miniport driver." The GART miniport driver provides GART services for the computer software operating system.

Residing in the system memory, the GART table may be read from and/or written to by the core logic driver software, i.e. the aforementioned GART miniport driver, or any other software program or application specific interface ("API") program using the host microprocessor(s), AGP graphics devices, or a PCI device. The GART table is used by the computer system core logic to remap the virtual addresses of the graphics data requested by the AGP graphics controller to physical addresses of pages that reside in the computer system memory (translate addresses). Thus, the AGP graphics controller can work in contiguous virtual address space, but use non-contiguous pages of physical system memory to store graphics data such as textures and the like.

Typically, the core logic will cache a subset of the most recently accessed GART table entries to increase system performance when mapping from the AGP device address space (AGP virtual address space) to the physical address space of the computer system main memory. The most recently accessed entries in the GART table are cached. Using a single GART cache works well if only one device interface accesses the cache. However, if multiple computer interfaces access the same cache index, then thrashing of the cache may result, or at least one interface will be forced to wait while the cache arbiter services another interface. Thrashing of the GART cache and/or having to wait during GART cache arbitration may significantly compromise the performance of the GART cache. Each interface may have its own unique caching requirements and inefficiencies may result if a single caching algorithm must be employed for all of the interfaces.

What is needed is a system method and apparatus for reducing potential GART cache thrashing and GART cache arbitration delays when multiple device interfaces access the GART cache when requiring GART translations.

OBJECTS OF THE INVENTION

It is therefore an object of the present invention to reduce potential GART cache thrashing when multiple device interfaces access the GART cache.

Another object is to reduce GART cache arbitration delays.

Still another object of the present invention is to store GART table entries in separate first level GART caches associated with each device interface requiring GART address translations so that each of the separate first level GART caches may be fine tuned for its associated device interface.

Another object is to store GART table entries requested by a plurality of device interfaces in a second level cache common to all of the device interfaces.

Yet another object is to flush all first level GART caches whenever a second level GART cache entry is invalid or updated.

Still another object is to flush all first level GART caches whenever a second level GART cache is flushed.

SUMMARY OF THE INVENTION

The above and other objects of the present invention are satisfied, at least in part, by providing in a computer system a core logic chipset that functions as a bridge between an AGP bus and host and memory buses wherein a "Graphics Address Remapping Table" ("GART table") is used by the core logic chipset to remap virtual addresses into physical addresses that reside in the computer system memory. Entries of the GART table may also reside in the computer system memory. The core logic chipset uses the GART table entries so that a host processor(s), an AGP graphics controller, or a PCI device may reference addresses of graphics information in contiguous virtual address space, hereinafter "AGP device address space," but actually have the graphics information stored in non-contiguous blocks of the computer system physical memory. The graphics information may be textures, z-buffers, command lists and the like. The core logic chipset of the present invention caches the necessary GART table entries in order to speed up address translation and subsequent retrieval of the graphics information from the computer system memory.

The GART table is made up of a plurality of entries. A GART miniport driver creates the entries in the computer system memory that make up the GART table. Each of these entries comprise a translation pointer which references the physical address of the first byte of a page in physical memory, and feature flags associated with the referenced page. Each page in physical memory referenced by the GART table contains AGP graphics information such as textures and the like. The feature flags may be used to customize each associated page of memory referenced by the pointer address.

The AGP Specification entitled "Accelerated Graphics Port Interface Specification Revision 1.0," dated Jul. 31, 1996, as referenced above, is available from Intel Corporation, and is hereby incorporated by reference. Further definition and enhancement of the AGP Specification is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned, co-pending U.S. patent application Ser. No. 08/853,289; filed May 9, 1997, entitled "Dual Purpose Apparatus, Method and System for Accelerated Graphics Port and Peripheral Component Interconnect" by Ronald T. Horan and Sompong Olarig, and which is hereby incorporated by reference. A detailed description of enhancements made to AGP is also disclosed in commonly owned, co-pending patent application U.S. patent application Ser. No. 08/925,772, filed Sep. 8, 1997, entitled "Graphics Address Remapping Table Entry Feature Flags for Customizing the Operation of Memory Pages Associated with an Accelerated Graphics Port Device" by Ronald T. Horan, Phillip M. Jones, Gregory N. Santos, Robert Allan Lester, and Robert Elliott, and is hereby incorporated by reference.

In an embodiment of the present invention, the core logic chipset comprises a two-level cache memory system for storing GART table entries when a single-level address remapping is implemented, and, in addition, GART directory entries when a two-level GART address remapping is implemented. Each GART table entry, stored in the two-level cache, references a page boundary of a linear address of the AGP device address space, and is used as a pointer to the base address of an associated page of graphics data stored in the physical memory. The computer system processor interface, the host/PCI interface, and the AGP interface may perform AGP transactions which require appropriate GART address translations. Each interface may address a different AGP address space(s) when performing read and/or write transactions, thus, different GART table entries may be required for each interface. If a single common GART cache were used for all of the interfaces requiring GART address translations, there is a high probability that the different interface GART table entry requirements would cause a single common GART cache to thrash, even if it was a multi-way cache. There would also be considerable performance penalties associated with arbitration delays as interfaces compete for the common GART cache accesses.

The present invention substantially reduces cache thrashing and arbitration delays by providing a closely coupled and dedicated first-level or "L1" cache for each interface in the core logic chipset. A common second-level or "L2" cache may be shared between the individual dedicated L1 caches. Each of the L1 caches may be customized for optimum performance given the requirements of its respective interface. For example, when an interface requires simultaneous read and write transactions to different AGP pages in the computer system main memory, a read-L1 cache and a write-L1 cache may be used for that interface. The read-L1 and write-L1 caches may operate independently of each other, and may enable a corresponding GART translation cycle on a hit and request an L2 translation on a miss. On the other hand, if the majority of transaction cycles are of one type or the other, such that write transactions will not thrash read transactions of the interface, then a unified read/write transaction L1 cache may be used. The L1 caches may be either direct mapped (one-way) or multi-way, or some of the L1 caches may be one-way and the other L1 caches may be multi-way. The L2 cache may be one-way or multi-way, and any combination of one-way and multi-way L1 and L2 caches are contemplated herein for the present invention.

In a preferred embodiment of the present invention, a two-level GART cache system in the core logic chipset comprises a L2 GART cache, a processor interface L1 GART cache, a host/PCI interface L1 GART cache, and an AGP interface L1 GART cache. The L2 GART cache may be used in common by all of the L1 caches, and each L1 cache may be closely coupled to its respective interface. The L2 GART cache may be direct mapped (one-way) or may be multi-way, and may store a plurality of GART table entries, such as for example 128 GART table entries. The processor interface L1 GART cache may be one-way and store up to several GART table entries. The host/PCI interface L1 GART cache may also be one-way and store up to several GART table entries. The AGP interface L1 GART cache preferably may be a multi-way cache and store up to eight GART table entries. Any of the L1 caches may have separate read and write transaction portions, or may be integrated for both read and write transactions. An additional L2 GART directory cache may be implemented for two-level GART address translation, and may store up to 128 GART directory entries. The L2 cache may also be integrated such that both GART table entries and GART directory entries are stored therein.

When an interface requires a GART address translation, the interface makes its transaction request to its respective L1 cache which must determine whether the required GART table entry is present (a cache hit) or not present ( a cache miss). If there is an L1 cache hit, the GART address translation cycle occurs for that interface. If there is an L1 cache miss, then the L1 cache requests the common L2 cache to supply it the required GART table entry. If the L2 cache has the requested GART table entry, then the requesting L1 cache stores the requested GART table entry from the L2 cache while the GART address translation cycle proceeds for the respective interface. However, if the L2 cache does not have the required GART table entry (L2 miss), then the L2 cache must request the required GART table entry from the computer system memory controller which performs a memory access to obtain the required GART table entry from the main memory. After the memory controller obtains the required GART table entry, it is stored in both the L2 cache and the requesting L1 cache while the GART address translation cycle proceeds for the respective interface.

Address translation performance using the two-level GART cache, according to the present invention, has minimum delay when there is an L1 cache hit since no GART cache arbitration is necessary. When there is an L1 cache miss and an L2 cache hit, only two to three clocks more time are required (arbitration time, etc.). For both L1 and L2 GART cache misses, a normal computer system memory access time is required.

Coherency between the L2 cache and the L1 caches may be maintained by flushing all of the L1 caches whenever the L2 cache is flushed, has an entry updated, or has an entry invalidated. Flushing of all of the L1 caches does not cause a significant time penalty because of the close coupling of the L1 caches to the commonly used L2 cache in the core logic chipset. Coherency between the L2 Cache and the main memory is maintained as more fully described in commonly owned, co-pending patent application U.S. patent application Ser. No. 08/941,862; filed Sep. 30, 1997, entitled "Accelerated Graphics Port Memory Mapped Status and Control Registers" by Ronald T. Horan, Phillip M. Jones, Gregory N. Santos, Robert Allan Lester, and Robert Elliott, and is hereby incorporated by reference.

A feature of the present invention is that individual device L1 GART table caches will not thrash each other because each L1 cache is decoupled from the other L1 caches and are only connected to their respective interfaces and a common L2 cache.

Still another feature is that all of the L1 GART table caches will be flushed whenever the common L2 cache is flushed, an L2 entry is invalidated, or an L2 entry is updated.

An advantage of the present invention is by using separate L1 caches, arbitration between interfaces for a common cache is not required and concurrent GART address translations for the different interfaces are possible.

Another advantage is by using decoupled L1 caches, the computer system may be better tuned for optimum performance than when using only a common single-level cache.

Still another advantage is that the L1 caches allow the respective interfaces to rapidly obtain a GART address translation because the number of gate levels is reduced, thus minimizing propagation delays.

An advantage of the present invention is using only one L2 cache which is common to the L1 caches associated with each interface.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The present invention provides a core logic chipset in a computer system which is capable of implementing a bridge between host processor and memory buses, an AGP bus adapted for an AGP device(s), and a PCI bus adapted for PCI devices. The AGP device may be a graphics controller which utilizes graphical data such as textures by addressing a contiguous virtual address space, hereinafter "AGP device address space," that is translated from non-contiguous memory pages located in the computer system physical memory by the core logic chipset. The core logic chipset utilizes a "Graphics Address Remapping Table" ("GART table") which may reside in a physical memory of the computer system, such as system random access memory, and may be controlled by the core logic chipset software driver(s). The function of the GART table is to remap virtual addresses referenced by the AGP device to the physical addresses of the graphics information located in the computer system physical memory. Each entry of the GART table describes a first byte address location for a page of physical memory. The page of physical memory may be 4,096 bytes (4 KB) in size. A GART table entry comprises a memory address translation pointer which may be cached to improve the performance of the core logic chipset when mapping from the virtual memory address space to the physical addresses that reside in the physical (main) memory.

The PCI specifications referenced above are readily available and are hereby incorporated by reference. The AGP Specification entitled "Accelerated Graphics Port Interface Specification Revision 1.0," dated Jul. 31, 1996, as referenced above, is available from Intel Corporation, and is hereby incorporated by reference. Further definition and enhancement of the AGP Specification is more fully defined in "Compaq's Supplement to the 'Accelerated Graphics Port Interface Specification Version 1.0'," Revision 0.8, dated Apr. 1, 1997, and is hereby incorporated by reference. Both of these AGP specifications were included as Appendices A and B in commonly owned, co-pending U.S. patent application Ser. No. 08/853,289; filed May 9, 1997, entitled "Dual Purpose Apparatus, Method and System for Accelerated Graphics Port and Peripheral Component Interconnect" by Ronald T. Horan and Sompong Olarig, and which is hereby incorporated by reference. A detailed description of enhancements made to AGP is also disclosed in commonly owned, co-pending patent application U.S. patent application Ser. No. 08/925,772; filed Sep. 8, 1997, entitled "Graphics Address Remapping Table Entry Feature Flags for Customizing the Operation of Memory Pages Associated with an Accelerated Graphics Port Device" by Ronald T. Horan, Phillip M. Jones, Gregory N. Santos, Robert Allan Lester, and Robert Elliott, and is hereby incorporated by reference.

For illustrative purposes, the preferred embodiment of the present invention is described hereinafter for computer systems utilizing the Intel x86 microprocessor architecture and certain terms and references will be specific to those processor platforms. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI Specifications.

Figure 1:
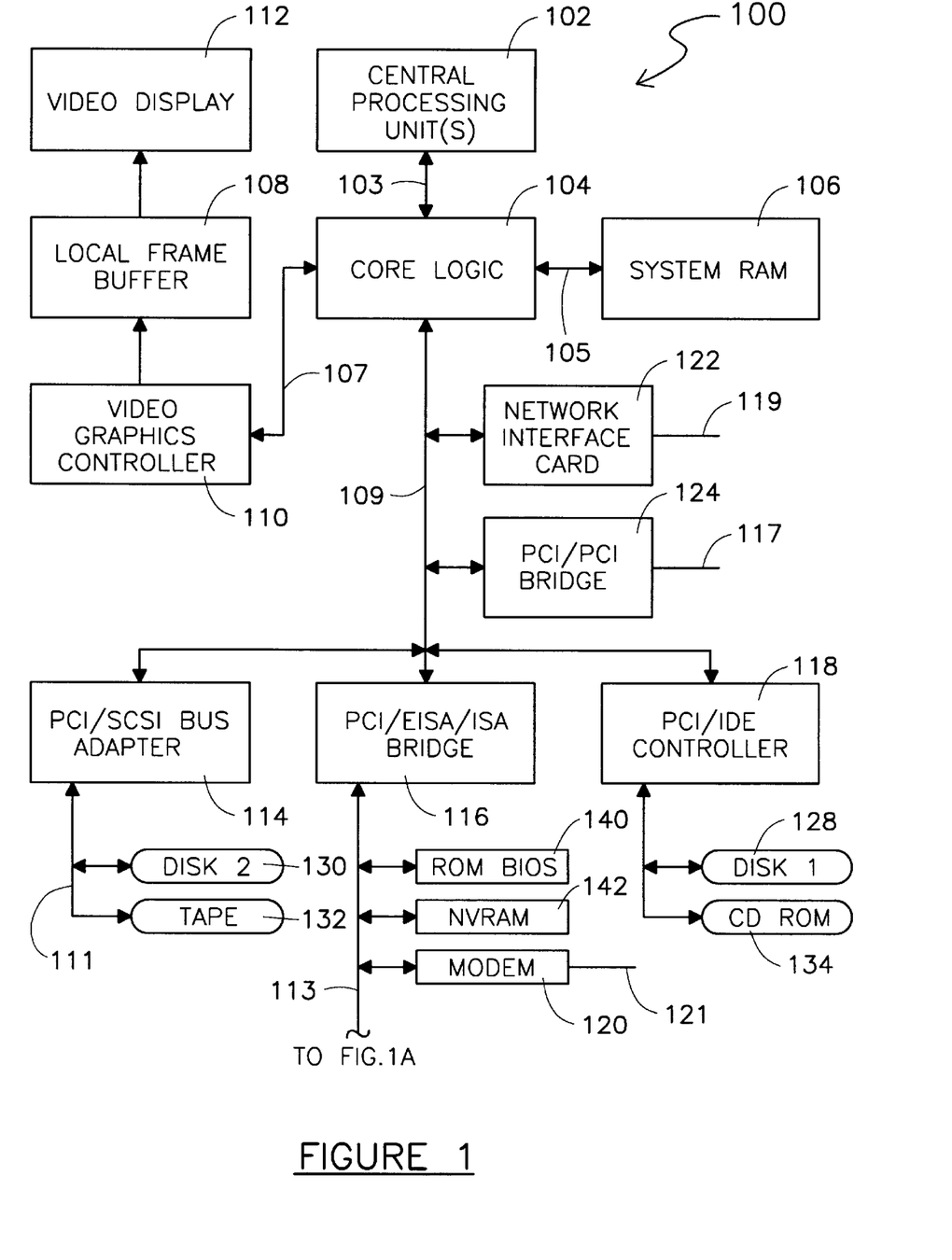
FIG. 1 is a schematic block diagram of a computer system according to the present invention.
Figure 1A:
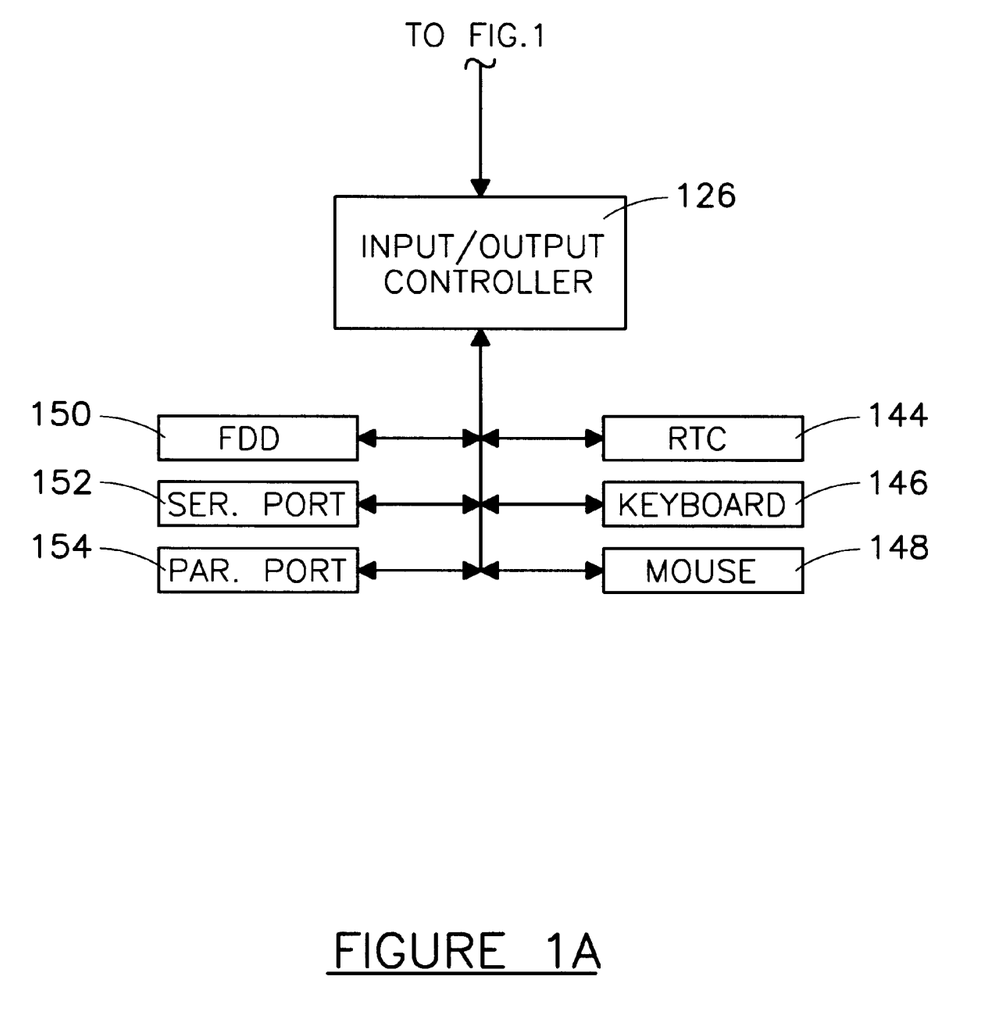

Referring now to the drawings, the details of preferred embodiments of the present invention are schematically illustrated. Like elements in the drawings will be represented by like numbers, and similar elements will be represented by like numbers with a different lower case letter suffix. Referring now to FIG. 1, a schematic block diagram of a computer system utilizing the present invention is illustrated. A computer system is generally indicated by the numeral 100 and comprises a central processing unit(s) ("CPU") 102, core logic 104, system random access memory ("RAM") 106, a video graphics controller 110, a local frame buffer 108, a video display 112, a PCI/SCSI bus adapter 114, a PCI/EISA/ISA bridge 116, and a PCI/IDE controller 118. The CPU 102 may be a plurality of CPUs 102 in a symmetric or asymmetric multi-processor configuration.

The CPU(s) 102 is connected to the core logic 104 through a host bus 103. The system RAM 106 is connected to the core logic 104 through a memory bus 105. The video graphics controller(s) 110 is connected to the core logic 104 through an AGP bus 107. The PCI/SCSI bus adapter 114, PCI/EISA/ISA bridge 116, and PCI/IDE controller 118 are connected to the core logic 104 through a PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 100 motherboard (not illustrated).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, a serial port 152, and a parallel port 154. The EISA/ISA bus 113 is a slower information bus than the PCI bus 109, but it costs less to interface with the EISA/ISA bus 113.

Figure 2:
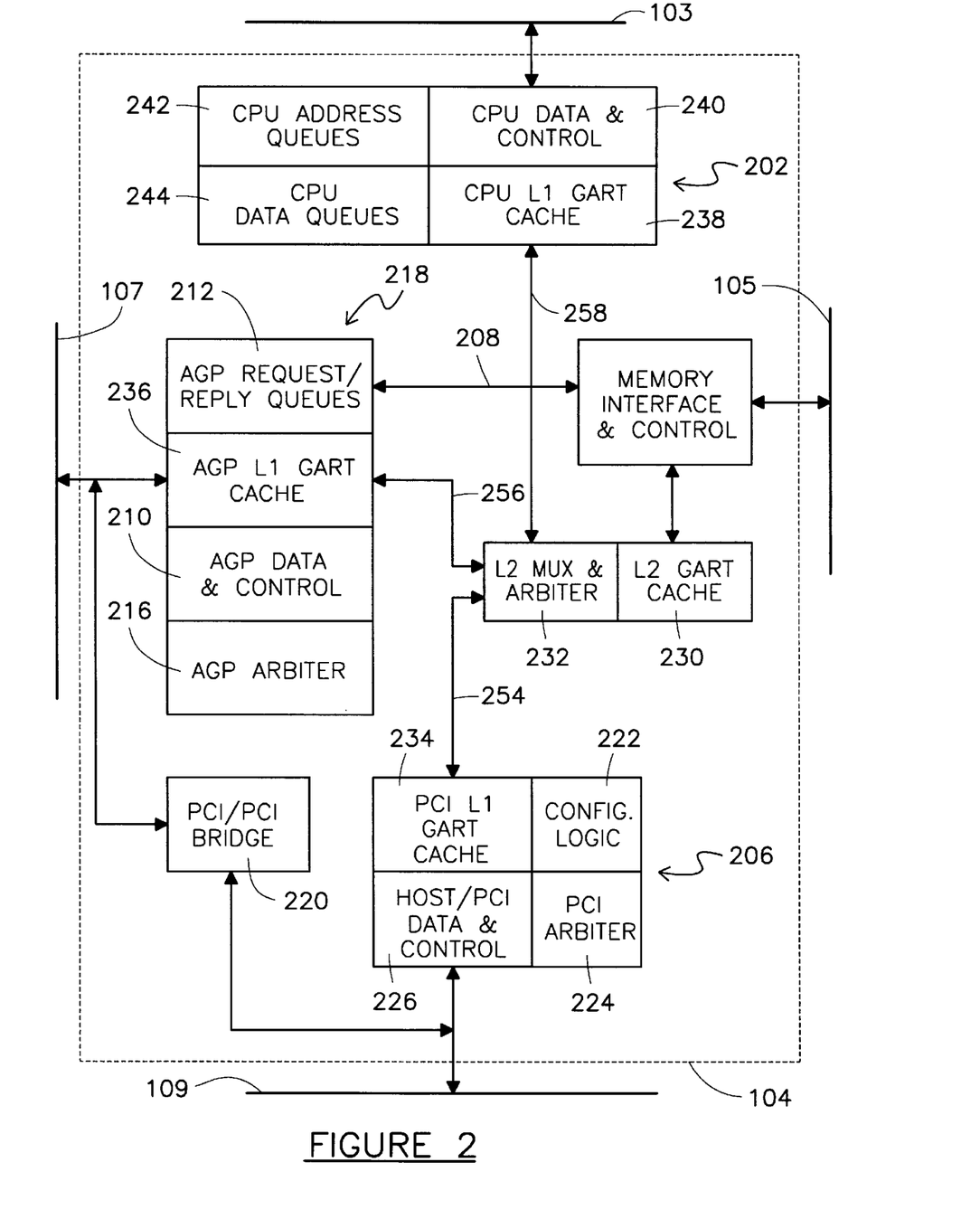
FIG. 2 is a schematic functional block diagram of an embodiment of the present invention according to the computer system of FIG. 1.

Referring now to FIG. 2, a schematic functional block diagram of the core logic 104 of FIG. 1, according to the present invention, is illustrated. The core logic 104 functionally comprises a CPU host bus interface 202, a memory interface and control 204, a host/PCI bridge 206, an AGP logic 218, a PCI/PCI bridge 220, an L2 GART Cache 230 and an L2 multiplexer and arbiter 232. The CPU host bus interface 202 comprises a CPU data and control logic 240, CPU address queues 242, CPU data queues 244 and a CPU L1 GART cache 238. The CPU host bus interface 202 connects to the host bus 103 and is used for all data, address and control signals associated with the CPU(s) 102 of the computer system 100. Multiple CPUs 102 and cache memory associated therewith (not illustrated) are contemplated and within the scope of the present invention. The AGP logic 218 comprises AGP request/reply queues 212, an AGP data and control logic 210, an AGP arbiter 216 and an AGP L1 GART cache 236. The host/PCI bridge 206 comprises a host/PCI data and control logic 226, a PCI arbiter 224, a configuration logic 222 and a PCI L1 GART cache 234.

The CPU host bus interface 202 interfaces with the host/PCI bridge 206 and memory interface and control 204 over an information bus (not illustrated for clarity). The CPU host bus interface 202 interfaces with the AGP logic 218 over another information bus (not illustrated for clarity). The memory interface and control 204 interfaces with the AGP logic 218 over an information bus 208. An advantage of having separate information buses between the CPU host bus interface 202 and the host/PCI bridge 206, and the memory interface and control 204 and AGP logic 218 is that concurrent bus operations may be performed thereover. For example, AGP graphics information stored in the system RAM 106 may be transferring to the video graphics controller 110 (AGP device) on the AGP bus 107 while the CPU 102 on the host bus 103 is accessing an independent PCI device (i.e., NIC 122) on the PCI bus 109.

The host bus interface 202 allows the CPU 102 to pipeline cycles and schedule snoop accesses. The memory interface and control 204 generates the control and timing signals for the computer system RAM 106 which may be synchronous dynamic RAM (SDRAM) and the like. The memory interface and control 204 has an arbiter (not illustrated) which selects among memory accesses for CPU writes, CPU reads, PCI writes, PCI reads, AGP reads, AGP writes, and dynamic memory refresh. Arbitration may be pipelined into a current memory cycle, which ensures that the next memory address is available on the memory bus 105 before the current memory cycle is complete. This results in minimum delay, if any, between memory cycles.

The PCI L1 GART cache 234, AGP L1 GART cache 236 and the CPU L1 GART cache 238 are connected to the L2 multiplexer and arbiter 232 over information (data and control) buses 254, 256 and 258, respectively. The L2 multiplexer and arbiter is used to arbitrate requests from the L1 GART caches 234, 236 and 238 and connect these L1 GART caches to the L2 GART cache 230 when there is a L1 GART cache miss. Contemplated herein according to the present invention, the L1 GART caches 234, 236 and 238 may be single way or multi-way caches. These L1 GART caches may comprise separate read and write transaction caches, or they may be integrated read and write caches depending on the specific needs of the respective interface they serve. The L2 GART cache 230 may be a single way or multi-way cache. The L1 GART caches are closely coupled to their respective interfaces and are independently operable so that concurrent AGP device address translations may occur for the different interfaces 202, 218 and 206. Access to the L2 GART cache is only required when there is a cache miss in any of the L1 GART caches, and access to the RAM 106 for a GART table entry is only required when there is a cache miss in the L2 GART cache.

The host/PCI bridge 206 controls the interface to the PCI bus 109. When the CPU 102 accesses the PCI bus 109, the host/PCI bridge 206 operates as a PCI master. When a PCI device is a master on the PCI bus 109, the host/PCI bridge 206 operates as a PCI slave (target). The host/PCI bridge 206 contains base address registers for PCI device targets on its PCI bus 109 (not illustrated). Operation of PCI is more fully described in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996, the disclosures of which are hereby incorporated by reference. These PCI specifications and ECN are hereby incorporated by reference and are available from the PCI Special Interest Group, P.O. Box 14070, Portland, Oreg. 97214.

The AGP data and control 210, AGP arbiter 216, and AGP request/reply queues 212 interface to the AGP bus 107 and also have signal, power and ground connections (not illustrated) for implementation of signals defined in the AGP and PCI specifications incorporated by reference hereinabove. The AGP bus 107 is adapted for connection to an AGP device(s) and/or an AGP connector(s) (not illustrated).

The PCI/PCI bridge 220 is connected between the PCI bus 109 and the AGP bus 107. The PCI/PCI bridge 220 allows existing enumeration code in the computer system BIOS 140 to recognize and handle AGP compliant devices, such as the video graphics controller 110, residing on the AGP bus 107. The PCI/PCI bridge 220, for example, may be used in configuring the control and status registers of the AGP graphics controller 110 or the AGP logic 218 by bus enumeration during the computer system startup or power on self test (POST), both being connected to the AGP bus 107.

Figure 3:
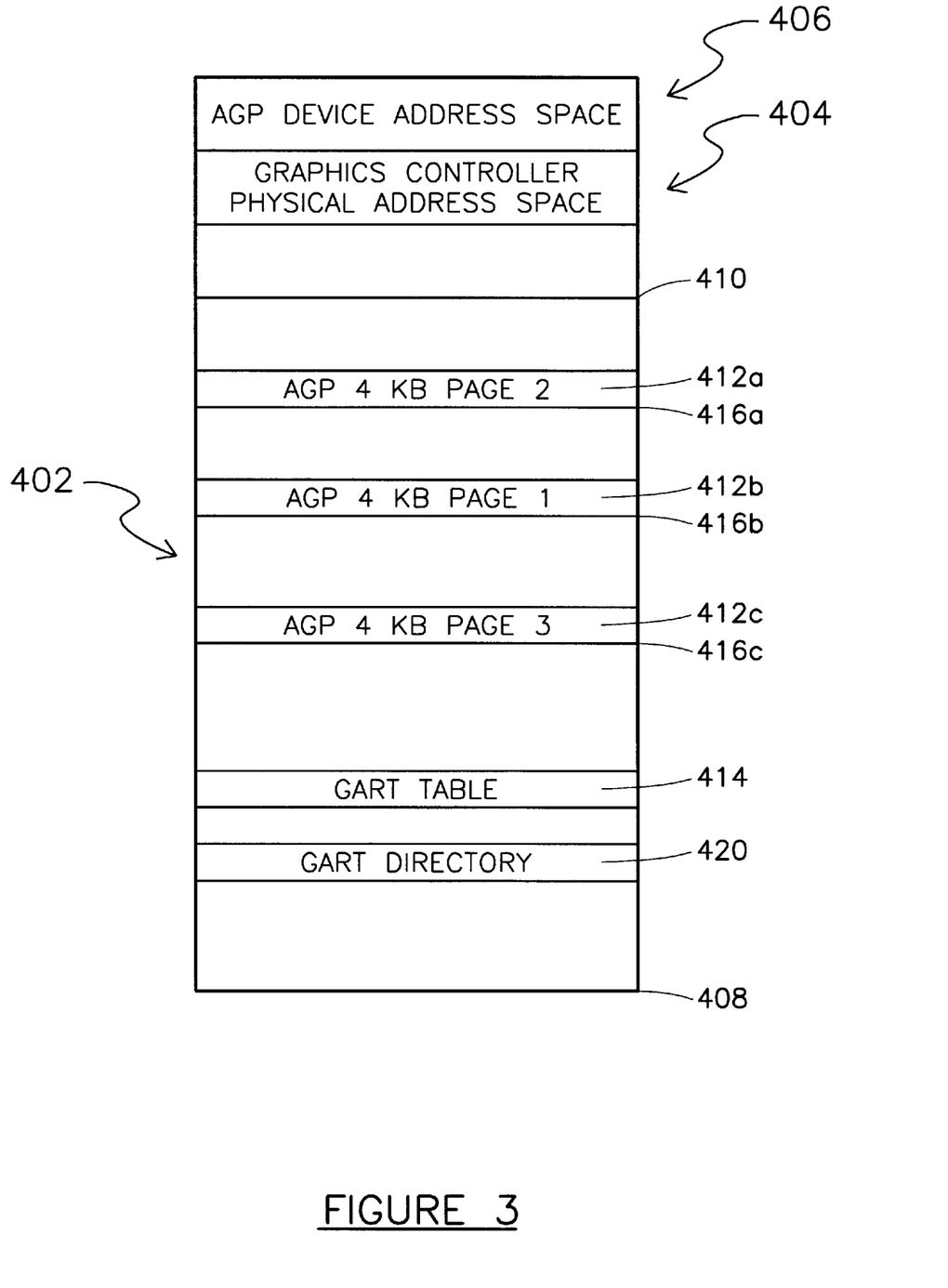
FIG. 3 is a schematic diagram of a computer system memory map, according to the present invention.
Figure 4:
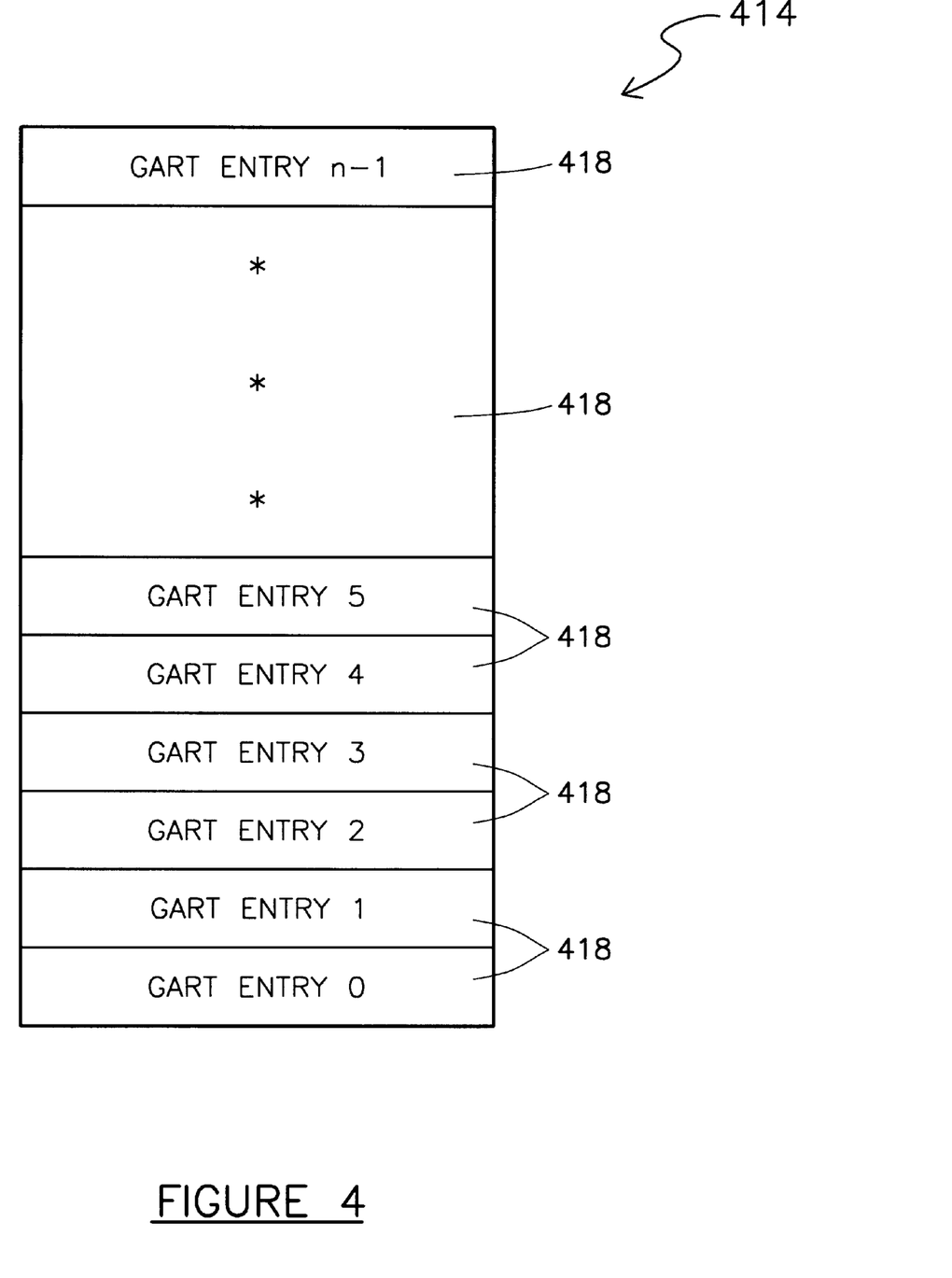
FIG. 4 is schematic diagram of a GART table comprising a plurality of GART table entries, according to the present invention.

Referring now to FIGS. 3 and 4, schematic diagrams of a memory map of the computer system, and a GART table in the computer system memory are illustrated. A logical memory map of the computer system RAM 106 is generally indicated by the numeral 402, the graphics controller physical address space by the numeral 404, and the AGP device address space (virtual memory) by the numeral 406. The computer system 100 may address up to 4 gigabytes ("GB") of memory with a 32 bit address, however, some of this 4 GB of memory address space may be used for local memory associated with various devices such as the AGP video graphics controller's 110 memory which may include the local frame buffer 108, texture cache, alpha buffers, Z-buffers, etc., all being addressed within the graphics controller physical address space 404. In addition, according to the present invention, some of the memory address space 402 is used for the AGP device address space 406. In FIG. 3, the bottom (lowest address) of the computer system memory 106 is represented by the numeral 408 and the top (highest address) is represented by the numeral 410. In between the bottom 408 and the top 410 are various blocks or "pages" of AGP memory represented by the numeral 412. Each page 412 has a contiguous set of memory addresses.

Some of these AGP memory pages (indicated by 412a, 412b and 412c) are used to store AGP information, such as graphic textures, lists and the like, and at least one page (represented by the number 414) is used to store entries in the GART table 414. The GART table 414 comprises a plurality of entries 418 (FIG. 4). Enough GART table entries 418 are stored to represent all of the associated AGP device address space 406 being used in the computer system 100. Each GART table entry 418 represents the base address 416 of the respective page 412 of the AGP memory. Another memory page may also be used to store a GART directory (represented by the number 420). The GART directory 420 is used for two-level address remapping as more fully described in the AGP specifications incorporated by reference hereinabove. Each GART table entry 418 stores 32 binary bits of information (a doubleword). The GART table 414 is used to remap AGP device address space 406 to addresses of the pages 412, by using the upper bits (31:12) to store a base address 416 for each of the corresponding 4 KB pages 412. The lower 12 bits of the AGP device address 406 is the same as the lower 12 bits of the address of the page 412, as more fully described in "Compaq's Supplement to the 'Accelerated Graphics Port Interface Specification Version 1.0'," Revision 0.8, dated Apr. 1, 1997, incorporated by reference hereinabove.

The video graphics controller 110 asserts addresses on the AGP bus 107 requesting the required graphical texture data. The AGP logic 218 receives these addresses for the requested graphical texture data which reference the AGP device addresses 406, however, the AGP device addresses 406 are virtual addresses and do not physically exist in the computer system 100 RAM 106. The AGP logic 218 therefore must remap these AGP device addresses 406 into the actual AGP pages 412 residing in the RAM 106. These AGP pages 412 are not contiguous nor are they in any particular order. The GART table 414 is used to remap the AGP device addresses 406 to the actual physical addresses of the AGP pages 412 residing in the RAM 106 (physical memory—logical memory map 402). The core logic chipset 104 caches a subset of the most recently used GART table entries 418 in the respective L1 GART cache 234, 236 or 238 to increase AGP performance when performing the GART address translations. AGP GART address translation speed is improved whenever a read transaction cycle to the RAM 106 is not needed to obtain a selected GART table entry 418, i.e., there is a cache hit in the L1 GART caches 234, 236 or 238, or there is a cache hit in the L2 GART cache 230. A cache miss in any of the L1 GART caches may not require a read transaction cycle to the RAM 106 if the L2 GART has the needed GART table entry 418.

Figure 5:
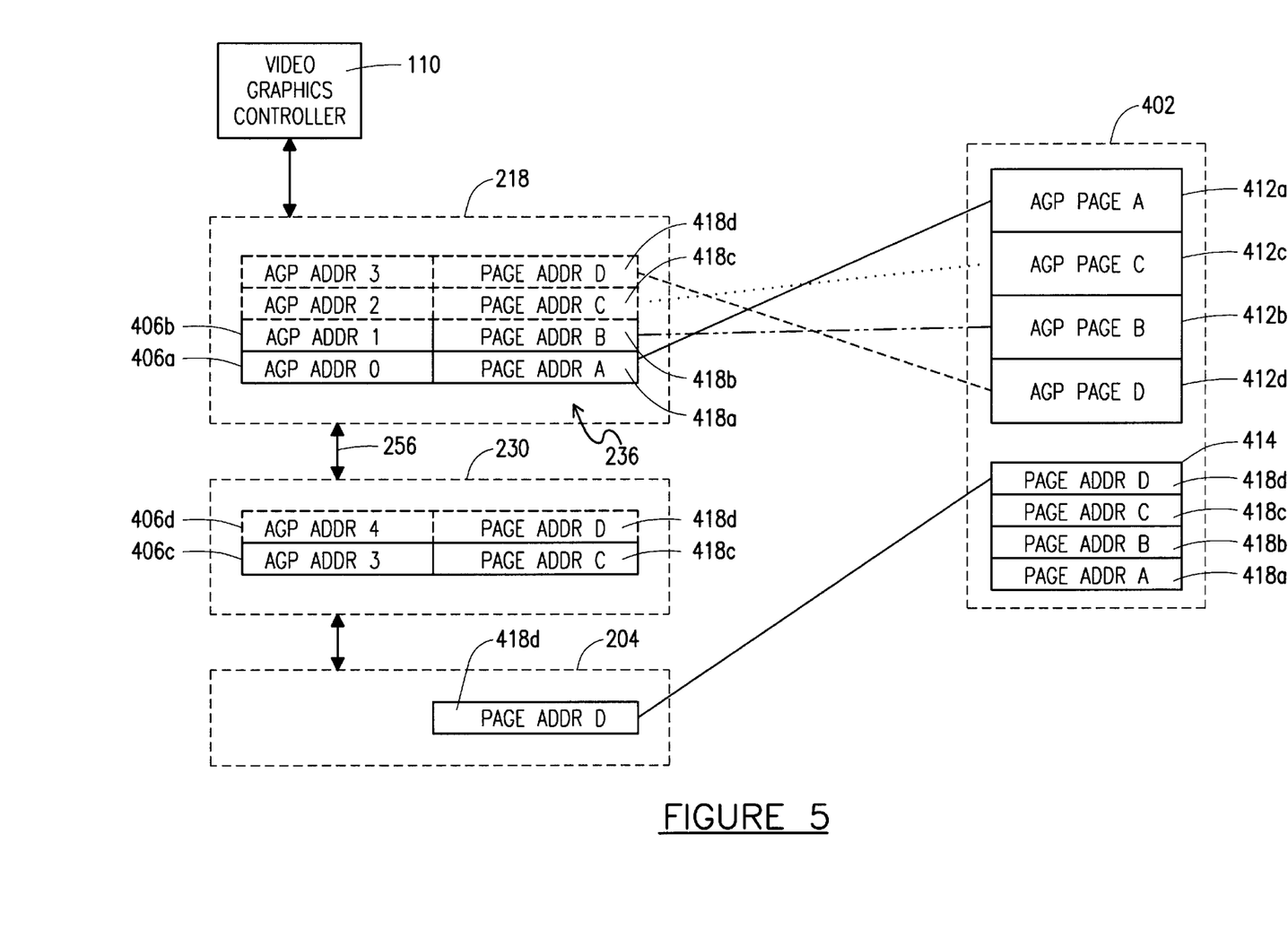
FIG. 5 is a schematic functional block diagram of a portion of the computer system of FIG. 2, and a partial memory map of FIG. 3.

Referring now to FIG. 5, a schematic functional block diagram of the AGP L1 GART cache 236, the L2 GART cache 230, the memory interface and control 204, the video graphics controller 110 and a portion of the AGP memory map 402 are illustrated. When the video graphics controller 110 requests graphics texture data on the AGP bus 107, the AGP logic 218 evaluates the asserted AGP device address space 406 to determine if the associated GART table entry 418 is in the AGP L1 GART cache 236. For example, if the required GART table entry 418a is in the AGP L1 GART cache 236 (a cache hit) the AGP logic 218 performs a memory read access of the AGP page 412a located in the physical memory (RAM 106) and remaps the page 412a to the desired AGP device address space 406a. However, if the required GART table entry 418c is not found in the AGP L1 GART cache 236 (an L1 cache miss), then the AGP logic 218 must first update the AGP L1 GART cache 236 with the required GART table entry 418c from the L2 GART cache 230 (an L2 cache hit). If, for example, the required GART table entry 418d is neither in the AGP L1 GART cache 236 nor the L2 GART cache 230 (a core logic GART cache miss), then the core logic chipset 104 must obtain the required GART table entry 418d from the GART table 414 stored in the RAM 106. The memory interface and control 204 performs a memory read access to the RAM 106 to obtain the required GART table entry 418d. Once the GART table entry 418d is returned from the memory read access, it is stored in the L2 GART cache 230 and also is stored in the AGP L1 GART cache 236. In this way, a required GART table entry 418 may be available when a subsequent AGP device address space translation is required.

The same sequence of operations may be repeated for the PCI L1 GART cache 234 and the CPU L1 GART cache 238 in conjunction with the common L2 GART cache 230. The L2 multiplexer and arbiter connects the L1 GART caches 234, 236 and 238 to the L2 GART cache 230 by independent data and control buses 254, 256 and 258, respectively. All transaction control signals and data is sent to the respective L1 GART caches 234, 236 and 238 over these data and control buses 254, 256 and 258, respectively. Whenever a GART table entry 418 is invalidated, or updated in the L2 GART cache 230 all of the L1 GART caches 234, 236 and 238 are flushed. This maintains coherency between the L1 GART caches 234, 236 and 238 and the L2 GART cache 230. Whenever the L2 GART cache 230 is flushed, the L1 GART caches 234, 236 and 238 are flushed. Coherency between the L2 Cache and the main memory is maintained as more fully described in commonly owned, co-pending patent application U.S. patent application Ser. No. 08/941,862; filed Sep. 30, 1997, entitled "Accelerated Graphics Port Memory Mapped Status and Control Registers" by Ronald T. Horan, Phillip M. Jones, Gregory N. Santos, Robert Allan Lester, and Robert Elliott, as incorporated by reference hereinabove.

An advantage of the present invention is that the L1 GART caches 234, 236 and 238 are directly coupled to their respective interfaces and are thus decoupled from each other, i.e., a GART table entry 418 replacement in one of the L1 GART caches will not affect the entries in the other L1 GART caches, thus no thrashing. Also beneficial is the ability to tailor the characteristics of each of the L1 GART caches to their respective interfaces. For example, the AGP L1 GART cache 236 may be an eight element fully associative cache, the CPU L1 GART cache 238 may comprise separate read and write GART caches that may be direct mapped (one way) so that the CPU 102 may perform both read and write GART transactions without thrashing its GART caches, and the L2 GART cache 230 may be multi-way or direct mapped. The criteria for selection of what type of cache architecture will be used is maximum efficiency for the particular interface to be served, given the economic and physical constraints for the core logic chipset 104. GART address translations for the interfaces are also speeded up because the individual L1 GART caches 234, 236 and 238, being directly coupled to the respective interfaces, need no arbitration time to provide the required GART table entry 418.

FIG. 5 illustrates four GART table entries in an L1 cache for illustrative clarity, however, any number of GART table entries 418 may be cached in the present invention and are contemplated herein. Once the selected GART table entries 418 are written into a respective one of the L1 GART caches 234, 236 and 238, the AGP pages 412 may be read from the physical memory 106. The AGP pages 412 are not stored in the AGP logic 218 but are used by the video graphics controller 110 directly from the RAM 106. The AGP logic 218 acts as an address translator to remap the randomly ordered and non-contiguous AGP pages 412 into the contiguous AGP device address space 406.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system having a core logic chipset which connects a computer processor and memory to an accelerated graphics port (AGP) processor, said system comprising:

a system processor executing software instructions and generating graphics data;

a system memory having an addressable memory space comprising a plurality of bytes of storage, wherein each of the plurality of bytes of storage has a unique address; the software instructions and the graphics data being stored in some of the plurality of bytes of storage of said system memory, wherein the graphics data is stored in a plurality of pages of graphics data, each of the plurality of pages of graphics data comprising a number of the plurality of bytes of storage;

an accelerated graphics port (AGP) processor generating video display data from the graphics data and adapted for connection to a video display to display the video display data;

a core logic chipset having a common second-level cache memory;

said core logic chipset having a first interface logic for connecting said system processor to said system memory;

said first interface logic having a first first-level cache memory, said first first-level cache memory connected to said common second-level cache memory;

said core logic chipset having a second interface logic for connecting said system processor and said system memory to said AGP processor;

said second interface logic having a second first-level cache memory, said second first-level cache memory connected to said common second-level cache memory;

a graphics address remapping table (GART table) having a plurality of entries, each of the plurality of GART table entries comprising an address pointer to a corresponding system memory address of each of the plurality of pages of graphics data, the plurality of GART table entries being stored in some other of the plurality of bytes of storage of said system memory and each of the plurality of GART table entries being associated with a block of graphics device addresses;

said AGP processor requests a graphics data transaction by asserting a graphics device address to said second interface logic; and said second interface logic determines if a required one of the plurality of GART table entries is stored in said second first-level cache memory, wherein:

if the required one of the plurality of GART table entries is stored in said second first-level cache memory then said second interface logic uses the required one of the plurality of GART table entries to translate the graphics device address of the requested graphics data transaction to a corresponding address of a one of the plurality of pages of graphics data stored in said system memory;

if the required one of the plurality of GART table entries is not stored in said second first-level cache memory, then said core logic chipset determines if the required one of the plurality of GART table entries is stored in said common second-level cache memory;

if the required one of the plurality of GART table entries is stored in said common second-level cache memory, then said core logic chipset stores the required one in said second first-level cache memory, and said second interface logic uses the required one of the plurality of GART table entries to translate the graphics device address of the requested graphics data transaction to the corresponding address of the one of the plurality of pages of graphics data stored in said system memory; and if the required one of the plurality of GART table entries is not stored in said common second-level cache memory, then said core logic chipset accesses said system memory to obtain the required one of the plurality of GART table entries from said GART table, said core logic chipset stores the required one of the plurality of GART table entries from said GART table in said common second-level cache memory and said second first-level cache memory, and said second interface logic uses the required one of the plurality of GART table entries to translate the graphics device address of the requested graphics data transaction to the corresponding address of the one of the plurality of pages of graphics data stored in said system memory.

2. The computer system of claim 1, wherein:

said system processor requests a graphics data transaction by asserting a graphics device address to said first interface logic; and said first interface logic determines if a required one of the plurality of GART table entries is stored in said first first-level cache memory, wherein:

if the required one of the plurality of GART table entries is stored in said first first-level cache memory, then said first interface logic uses the required one of the plurality of GART table entries to translate the graphics device address of the requested graphics data transaction to a corresponding address of a one of the plurality of pages of graphics data stored in said system memory;

if the required one of the plurality of GART table entries is not stored in said first first-level cache memory, then said core logic chipset determines if the required one of the plurality of GART table entries is stored in said common second-level cache memory;

if the required one of the plurality of GART table entries is stored in said common second-level cache memory, then said core logic chipset stores the required one in said first first-level cache memory, and said first interface logic uses the required one of the plurality of GART table entries to translate the graphics device address of the requested graphics data transaction to the corresponding address of the one of the plurality of pages of graphics data stored in said system memory; and if the required one of the plurality of GART table entries is not stored in said common second-level cache memory, then said core logic chipset accesses said system memory to obtain the required one of the plurality of GART table entries from said GART table, said core logic chipset stores the required one of the plurality of GART table entries from said GART table in said common second-level cache memory and said first first-level cache memory, and said first interface logic uses the required one of the plurality of GART table entries to translate the graphics device address of the requested graphics data transaction to the corresponding address of the one of the plurality of pages of graphics data stored in said system memory.

3. The computer system of claim 1, further comprising:

a third interface logic for connecting said system processor and said system memory to input-output devices;

said third interface logic having a third first-level cache memory, said third first-level cache memory connected to said common second-level cache memory;

a one of said input-output devices requests a graphics data transaction by asserting a graphics device address to said third interface logic, and said third interface logic determines if a required one of the plurality of GART table entries is stored in said third first-level cache memory, wherein:

if the required one of the plurality of GART table entries is stored in said third first-level cache memory, then said third interface logic uses the required one of the plurality of GART table entries to translate the graphics device address of the requested graphics data transaction to a corresponding address of a one of the plurality of pages of graphics data stored in said system memory;

if the required one of the plurality of GART table entries is not stored in said third first-level cache memory, then said core logic chipset determines if the required one of the plurality of GART table entries is stored in said common second-level cache memory;

if the required one of the plurality of GART table entries is stored in said common second-level cache memory, then said core logic chipset stores the required one in said third first-level cache memory, and said third interface logic uses the required one of the plurality of GART table entries to translate the graphics device address of the requested graphics data transaction to the corresponding address of the one of the plurality of pages of graphics data stored in said system memory; and if the required one of the plurality of GART table entries is not stored in said common second-level cache memory, then said core logic chipset accesses said system memory to obtain the required one of the plurality of GART table entries from said GART table, said core logic chipset stores the required one of the plurality of GART table entries from said GART table in said common second-level cache memory and said third first-level cache memory, and said third interface logic uses the required one of the plurality of GART table entries to translate the graphics device address of the requested graphics data transaction to the corresponding address of the one of the plurality of pages of graphics data stored in said system memory.

4. The computer system of claim 1, further comprising a fourth interface logic for connecting said system processor and said system memory to storage devices.

5. The computer system of claim 1, wherein the plurality of pages of GART table entries are stored in said system memory in a non-contiguous and random order.

6. The computer system of claim 1, further comprising a GART directory having a plurality of entries, each of the plurality of GART directory entries comprising an address pointer to a corresponding one of the plurality of pages of GART table entries, wherein the plurality of GART directory entries are used for locating the plurality of pages of GART table entries in said system memory.

7. The computer system of claim 6, wherein said common second-level cache memory stores selected ones of the plurality of GART directory entries.

8. The computer system of claim 6, wherein said first first-level cache memory stores selected ones of the plurality of GART directory entries.

9. The computer system of claim 6, wherein said second first-level cache memory stores selected ones of the plurality of GART directory entries.

10. The computer system of claim 1, wherein said common second-level cache memory is a direct mapped cache memory.

11. The computer system of claim 1, wherein said common second-level cache memory is a multi-way cache memory.

12. The computer system of claim 1, wherein said common second-level cache memory is a four-way cache memory.

13. The computer system of claim 1, wherein said first first-level cache memory is a direct mapped cache memory.

14. The computer system of claim 1, wherein said first first-level cache memory is a multi-way cache memory.

15. The computer system of claim 1, wherein said first first-level cache memory comprises separate read and write cache memories.

16. The computer system of claim 1, wherein said second first-level cache memory is a direct mapped cache memory.

17. The computer system of claim 1, wherein said second first-level cache memory is a multi-way cache memory.

18. The computer system of claim 1, wherein:

said first and second first-level cache memories are connected to said common second-level cache memory with a multiplexer; and said multiplexer selects said first and second first-level cache memories with a cache arbiter.

19. The computer system of claim 1, wherein the number of the plurality of bytes of storage in each of the plurality of pages of graphics data is 4096 bytes.

20. The computer system of claim 1, wherein the system processor is a plurality of system processors.

21. The computer system of claim 1, further comprising a video display.

22. The computer system of claim 1, wherein the plurality of pages of graphics data are stored in said random access memory in a non-contiguous and random order.

23. The computer system of claim 1, further comprising a network interface card, a hard disk, a floppy disk drive, a modem, a keyboard and a mouse.

24. The computer system of claim 1, further comprising a serial port, a parallel port and a real time clock.

25. The computer system of claim 1, further comprising a read only memory basic input-output system (ROM BIOS), a non-volatile random access memory (NVRAM), a tape drive and a CD ROM drive.

26. The computer system of claim 1, wherein said core logic chipset is at least one integrated circuit.

27. The computer system of claim 26, wherein said at least one integrated circuit core logic chipset is at least one application specific integrated circuit.

28. The computer system of claim 26, wherein said at least one integrated circuit core logic chipset is at least one programmable logic array integrated circuit.

29. A core logic chipset adapted for connection to a computer system processor and system memory, and an accelerated graphics port (AGP), comprising:

an accelerated graphics port (AGP) interface having AGP request and reply queues, an AGP data and control logic, an AGP arbiter, and an AGP first-level graphics address remapping table (GART) cache, said AGP interface adapted for connection to an AGP processor, a processor interface having, processor address queues and processor data queues, a processor data and control logic, and a processor first-level GART cache, said processor interface adapted for connection to a computer system processor;

a memory interface and control logic adapted for connecting to a computer system memory; and a common second-level GART cache, said common second-level GART cache connected to said processor and AGP first-level GART caches, and said memory interface and control logic;

said AGP interface is adapted for receiving a graphics data transaction, such that said AGP interface determines if a required one of a plurality of GART table entries is stored in said AGP first-level GART cache, wherein:

if the required one of the plurality of GART table entries is stored in said AGP first-level GART cache, then said AGP interface uses the required one of the plurality of GART table entries to translate the graphics device address of the requested graphics data transaction to a corresponding address of a one of the plurality of pages of graphics data stored in the computer system memory;

if the required one of the plurality of GART table entries is not stored in said AGP first-level GART cache, then said core logic chipset determines if the required one of the plurality of GART table entries is stored in said common second-level GART cache;

if the required one of the plurality of GART table entries is stored in said common second-level GART cache, then said core logic chipset stores the required one in said AGP first-level GART cache, and said AGP interface uses the required one of the plurality of GART table entries to translate the graphics device address of the requested graphics data transaction to the corresponding address of the one of the plurality of pages of graphics data stored in the computer system memory; and if the required one of the plurality of GART table entries is not stored in said common second-level GART cache, then said core logic chipset is adapted to access the computer system memory to obtain the required one of the plurality of GART table entries from a GART table, said core logic chipset is adapted to store the required one of the plurality of GART table entries from the GART in said common second-level GART cache and said AGP second first-level GART cache, and said AGP interface uses the required one of the plurality of GART table entries to translate the graphics device address of the requested graphics data transaction to the corresponding address of the one of the plurality of pages of graphics data stored in said system memory.

30. The core logic chipset of claim 29, wherein said AGP first-level GART cache is a multi-way cache memory.

31. The core logic chipset of claim 29, wherein said processor first-level GART cache is a direct mapped cache memory comprising separate read and write caches.

32. The core logic chipset of claim 29, wherein said common second-level GART cache is a multi-way cache memory.

33. The core logic chipset of claim 29, wherein said common second-level GART cache is a direct mapped cache memory.

34. The core logic chipset of claim 29, wherein:

said AGP and processor first-level GART caches are connected to said common second-level GART cache with a multiplexer; and said multiplexer selects said AGP and processor first-level GART caches with a cache arbiter.

* * * * *